Patented July 6, 1954

2,682,930

UNITED STATES PATENT OFFICE 2,682,930

RECOVERY OF TITANIUM TETRACHLORIDE BY ADSORPTION

Ignace Joseph Krchma, Wilmington, Del., assignor to E. I. du Pont de Nemours and Company, Wilmington, Del., a corporation of Delaware No Drawing. Application January 23, 1951, Serial No. 207,437

6 Claims. (Cl. 183—114.2)

This invention relates to the recovery of titanium tetrachloride from gaseous mixtures and more particularly to the separation of titanium tetrachloride from mixtures containing relatively small amounts of such chloride and which cannot be readily condensed for recovery at normal atmospheric temperatures.

Titanium tetrachloride is usually prepared by subjecting a titanium-bearing ore or material such as ilmenite or rutile or a $TiO_2$ concentrate or other material to the action of chlorine at elevated (800–1350° C.) temperatures in the presence of carbon or like reducing material. Thereafter, the gaseous titanium tetrachloride is separated from the resulting gas mixture. The composition of the latter varies, depending on the composition of the titanium-bearing material, the chlorinating agent and the conditions employed in the chlorination. Usually, it contains, in addition to titanium tetrachloride, ferric chloride, chlorine, carbon monoxide, carbon dioxide, silicon tetrachloride and nitrogen. High boiling constituents such as ferric chloride can be condensed first, after which the bulk of the titanium tetrachloride is separated by condensation from the remaining gas mixture. However, as a result of the high vapor pressure of titanium tetrachloride, substantial amounts thereof will remain in the gas mixture unless the condensation is performed at temperatures so low as to be impractical. This is shown by the following tabulation which lists the approximate titanum tetrachloride content of gas mixtures which are saturated with it at various temperatures:

| Temperature, ° C. | $TiCl_4$ in saturated gas mixture, percent (by volume) |
|---|---|
| −10 | 0.2 |
| 0 | 0.4 |
| 10 | 0.8 |
| 20 | 1.4 |
| 30 | 2.2 |
| 40 | 3.5 |

The titanium tetrachloride remaining in the residual gases after condensing at room temperature will generally amount to from 2 to 10% of the total titanium tetrachloride produced. Obviously, such amounts represent a large economic loss if not recovered.

A common method of recovering gaseous substances in low concentration is to absorb the valuable component in an appropriate solvent by means of absorption towers or the like. Aqueous solutions are generally undesirable for the absorption of titanium tetrachloride since they tend to induce undesired decomposition thereof, in the form of hydrolysis, which prevents recovery of the titanium tetrachloride as such. Other solvents useful in absorption systems such as alcohols cause decomposition similar to that occurring with water. Unreactive solvents such as benzene or trichlorethylene are costly and hazardous to use.

In the case of adsorption, a common method of recovering adsorbed material comprises passing steam or air through the adsorbent substance. These methods cannot be employed with titanium tetrachloride because of the undesired hydrolysis which occurs in the presence of steam or normal air containing $H_2O$.

It is among the objects of this invention to overcome the above and other disadvantages characterizing prior $TiCl_4$ recovery operations and to provide novel and effective methods for accomplishing these objects. A particular object is to effect the separation and recovery, in usable form, of titanium tetrachloride from residual gaseous mixtures or those in which the $TiCl_4$ is present in small amounts, and without recourse to the costly, time-consuming, and unsatisfactory operations which prior adsorption methods entail.

These and other objects are accomplished in this invention which comprises separating titanium tetrachloride from a gaseous mixture by passing said mixture through a solid adsorbent material and thereafter recovering the adsorbed titanium tetrachloride from said material by desorption.

In a more specific embodiment, the invention comprises recovering $TiCl_4$ from a residual gas mixture containing from about 2–10% of that compound by subjecting said mixture to the action of an adsorptive agent and thereafter recovering the adsorbed $TiCl_4$ from said agent by subjecting the latter to desorption treatment.

In the practice of the invention, a gas mixture containing small amounts, sa, from 2–10% by weight, of titanium tetrachloride, is passed through one or more conventional type towers suitably packed with a solid absorbent contact material, such as, preferably, activated carbon. As a result, the titanium tetrachloride component of the mixture is readily adsorbed by such material and is completely removed therefrom, provided sufficient adsorbing surface is provided. To effect such complete removal, use of two or more adsorbing towers in series can be resorted to, if desired. When it becomes evident that some titanium tetrachloride is passing through the tower or towers without being adsorbed, the flow of mixed gases is discontinued and desorption and recovery of the TiCl₄ is then undertaken. The particular desorption method employed will depend on the use to which the recovered tetrachloride is to be put, and whether the product is to be recovered in pure form. Thus, the TiCl₄-containing adsorbent can be heated to less than 600° C. and preferably to about 350° C. in a conventional distillation vessel and the desorbed titanium tetrachloride recovered through condensation. One novel and effective method of heating the absorbent without diluting the desorbed titanium tetrachloride comprises passing a stream of titanium tetrachloride gas superheated to between 300° C. and 600° C. and preferably about 500° C. through the bed, and condensing the resulting product. Advantageously, this method gives much more rapid and uniform heating than any external heating arrangement, and avoids undesired dilution which would occur should other gaseous materials be employed.

When, however, the invention is employed in connection with the production of titanium tetrachloride by chlorination of titanium-bearing materials, I have found it desirable to desorb the tetrachloride by passing a hot (say, at 300° C.) current of a chlorinating gas unreactive with TiCl₄ through the adsorbent prior to employing such chlorinating gas in the production of additional titanium tetrachloride, thus recycling the product recovered by adsorption. Advantageously, a higher degree of desorption will be found to result when resort is had to such an inert gas rather than to simple heating.

If the recovered titanium tetrachloride is to be employed in the production of pigmentary titanium dioxide by, for example, vapor phase oxidation with an oxidizing gas, such as humidified air or oxygen, as contemplated in U. S. Patent 2,488,439, the desorption can be readily accomplished by passing a stream of dry air or oxygen at a temperature below that at which TiCl₄ oxidation will occur through the adsorbent towers. The TiCl₄-containing oxidizing gas can then be used directly in the vapor phase oxidation process. When this method is employed with adsorbent carbon, the temperature should be maintained at a somewhat lower level than with a chlorinating gas in order to prevent combustion of the carbon. I have found 200° C. a safe operating temperature under these conditions.

It is often advantageous to effect desorption by first removing as much titanium tetrachloride as possible by heating the adsorbent, as for example with superheated titanium tetrachloride, in order to recover the adsorbed material in pure form, and then to obtain a more complete desorption by gas "purging," as with chlorinating gas or oxidizing gas. Such a process combines the advantages of recovering pure titanium tetrachloride and of giving relatively complete desorption, thus increasing the capacity of the adsorbent.

Desorption by any of the methods described will not necessarily be complete, but advantageously removal of from 30 to 90% of the adsorbed titanium tetrachloride, depending on the nature of the adsorbent and the desorbing conditions, will be effected. While it is possible to remove a greater portion of the adsorbed material by use of higher temperature, degradation of the adsorbent often results. Consequently, recourse to such 30-90% removal is preferably had, which, although resulting in a lowering of the effective capacity of the adsorbent in subsequent cycles, permits use thereof over a prolonged period and obviates the necessity of frequent adsorbent replacement.

To a more complete understanding of the invention, the following illustrative examples are given, none of which is to be construed as limiting the invention:

Example I

A gas mixture containing about 11% by volume titanium tetrachloride and 89% nitrogen was cooled by passage through a condenser to 27° C., thereby condensing most of the titanium tetrachloride and giving a residual gas containing 1.6% by volume of the chloride. This gas was passed up through a 17 mm. glass tube, packed for a height of 20 inches with 52 grams of a commercial adsorbent carbon. The gas rate was maintained at 175 liters per hour, and during the first portion of the run no fumes were observed at the tower exit. After running 46 minutes, some fumes appeared, indicating incomplete removal of titanium tetrachloride. The gas flow was then discontinued and it was found that the weight of the tower had increased by 16 grams, representing complete recovery of the titanium tetrachloride from the gas mixture. This amount corresponded to the adsorption of 0.31 gram titanium tetrachloride per gram of carbon.

The carbon was then removed from the tower and heated gradually in a distilling vessel to 400° C. During this time, 6 grams of titanium tetrachloride, or 38% of the total, were removed for recovery from the carbon.

Example II

The tubular apparatus used in Example I was filled with 30 grams of another brand of commercial adsorbent carbon and a similar gas mixture containing 1.6% by volume titanium tetrachloride and 98.4% nitrogen, at 25° C., was passed through the tower at the same rate of 175 liters per hour. After 45 minutes, slight fuming at the top of the column was observed and the run was discontinued. It was found that the carbon had adsorbed 15 grams of titanium tetrachloride, representing 100% efficiency and an adsorption of 0.5 gram per gram of carbon. Heating the carbon to 350° C. in a distillation vessel under a slight vacuum released for recovery 7 grams of titanium tetrachloride, i. e., 47% of the total.

Example III

The adsorption step described in Example II was repeated, using the same type of adsorbent, the same gas mixture, and the same conditions. As before, complete adsorption took place and 15 grams of titanium tetracholride were adsorbed on the 30 grams of carbon.

Dry nitrogen gas at 360° C. was then passed through the absorbent mass in the tower for a period of two hours, at the end of which time it was found that 13.3 grams or 89% of the original 15 grams of titanium tetrachloride had been desorbed. Most of the TiCl₄ was recovered from the resulting gas mixture by cooling through passage through a condenser to 27° C.

The reactivated carbon obtained from this desorption step was then used for a second adsorption, using the gas mixture previously described. Adsorption was complete when 10.7 grams of titanium tetrachloride had been adsorbed. The total tetrachloride content of the carbon was then 12.4 grams. Heating of the adsorbent mass to 400° C. in a distillation vessel resulted in desorption and recovery of 7.2 grams of titanium tetrachloride.

*Example IV*

A gas mixture such as described in the preceding examples, containing 1.54% by volume of titanium tetrachloride, was passed through the glass tower type of apparatus described above containing 86 grams of a commercial activated alumina. Complete adsorption took place for 52 minutes, during which time 18 grams of titanium tetrachloride were adsorbed, corresponding to 0.21 gram per gram of alumina.

The alumina was then heated to 400° C. for one hour in a dry air stream to result in desorption and recovery of 11 grams or 61% of the total adsorbed titanium tetrachloride.

When this reactivated alumina was again used to adsorb titanium tetrachloride from a similar gas mixture, 12 additional grams of $TiCl_4$ were adsorbed. The alumina was again heated to 360° C. in a distillation vessel to desorb and recover 6 grams titanium tetrachloride, with no air stream being used in this instance.

*Example V*

69 grams of commercial activated silica were placed in the glass tower apparatus used in the preceding examples, following which a gas mixture containing 1.8% by volume titanium tetrachloride and 98.2% nitrogen, at 27° C., was passed therethrough at the rate of 175 liters per hour. After 20 minutes of operation, 5 grams, or 62%, of the titanium tetrachloride passing through the tower was found to have been adsorbed. This corresponded to adsorption of 0.07 gram per gram of silica. The silica absorbent was then removed from the tower and gradually heated to 400° C. in a distillation vessel. As a result, 3 grams or 60% of the total adsorbed $TiCl_4$ was recovered.

Since different adsorbing materials will be found to exhibit varying degrees of efficiency in the process, it will be obvious that the invention is not restricted to those mentioned. While activated carbon comprises a preferred useful adsorbent and is considered the most effective for employment herein, other materials are also adaptable and contemplated for use. Activated alumina and activated silica have been employed in Examples IV and V above. In addition to these and carbon, other adsorbent materials including titania gel, activated clays, bone char, bauxite, charcoal, and the like, can also be employed. Additionally, the use of activated adsorbing material free from water in any form not only improves the efficiency of adsorption but avoids decomposition of the titanium tetrachloride during either the adsorption or the desorption stages. Hence, in practically adapting the invention, the adsorption and desorption steps are effected under anhydrous conditions.

Also, since better performance and optimum results obtain when the temperature of the adsorbing material is in relatively low state, it is usually desirable and preferable to resort to some form of adsorbing bed cooling during the adsorption period. This can be effected by conventional water jacketing or arranging suitable cooling coils within the adsorbing bed, should it be desired to maintain such low temperature and achieve such optimum results.

Control of pressure in both the adsorption and the desorption steps will be found to also result in a more efficient performance. Recourse to such control will therefore be found to be advantageously useful. For instance, a faster rate of adsorption and a higher adsorbing capacity will result when a relatively high gas pressure, up to, say, 200 pounds per square inch, is employed. On the other hand, removal of adsorbed titanium tetrachloride will be promoted by conducting the desorption step under a subatmospheric pressure.

This invention is most usefully employable in the production of titanium tetrachloride through the chlorination of a titanium-bearing material with 30–100% $Cl_2$ in the presence of carbonaceous material at 600–1100° C., whereby a more complete yield of tetrachloride and avoidance of materials loss will be had. Product gases from the chlorination are cooled by conventional means to a temperature of approximately −10 to +30° C. to remove most of the $TiCl_4$ and other condensible chlorides. The tail gas from the conventional condensation is then passed through an adsorptive agent, and the adsorbed $TiCl_4$ is recovered from the latter through heating at temperatures of from 100–400° C. The gas containing the recovered $TiCl_4$ can then be recycled to the chlorination or condensation stages of the system, as desired. Another process in which $TiCl_4$ recovery can be effected in accordance with the invention comprises the vapor phase oxidation or hydrolysis of titanium tetrachloride. In such process, titanium tetrachloride is often present in the exhaust gases, either by virtue of incomplete reaction or because of an intentional use of an excess thereof. Where the exhaust gases, consisting largely of chlorine or hydrogen chloride, with or without nitrogen, are to be used directly for the chlorination of additional titanium, no need exists for separation of their titanium tetrachloride content. However, if these gases are to be used in some other way, recovery of their titanium tetrachloride by the process of this invention is desirable.

I claim as my invention:

1. A method for separating and recovering titanium tetrachloride from a residual gas mixture resulting from the chlorination in the presence of a carbonaceous substance of a titanium-bearing material and containing from about 2–10% by weight of said tetrachloride, comprising passing said gaseous mixture over a solid adsorptive agent within an anhydrous treating zone, and thereafter concurrently reactivating said agent and recovering the adsorbed $TiCl_4$ therefrom by subjecting it under anhydrous conditions to desorption heat treatment through direct contact with a separate, hot, non-reactive gas.

2. A method for separating and recovering titanium tetrachloride from a residual gas mixture resulting from the chlorination in the presence of a carbonaceous substance of a titanium-bearing material and containing from about 2–10% by weight of said tetrachloride, comprising passing said gaseous mixture over a solid adsorptive agent within an anhydrous treating zone, and thereafter concurrently reactivating said agent and recovering the adsorbed $TiCl_4$ therefrom by heating and directly contacting said agent under anhydrous conditions with superheated $TiCl_4$ at a temperature of from 300–600° C.

3. A method for separating and recovering titanium tetrachloride from a residual gas mixture resulting from the chlorination in the presence of a carbonaceous substance of a titanium-bearing material and containing from about 2–10% by weight of said tetrachloride, comprising passing said gaseous mixture over a solid adsorptive agent within an anhydrous treating zone, and thereafter concurrently reactivating said agent and recovering the adsorbed TiCl₄ therefrom by directly contacting with and passing thereover under anhydrous conditions a hot current of a separate inert chlorinating gas.

4. A method for separating and recovering titanium tetrachloride from a residual gas mixture resulting from the chlorination, at temperatures ranging from 800–1350° C., of ilmenite in the presence of carbon and containing from about 2–10% by weight of said tetrachloride, comprising directly contacting said gaseous mixture in a treating zone under anhydrous conditions with adsorbent carbon at a temperature of about 20° C., and then concurrently reactivating said carbon and recovering from about 30–90% of the adsorbed TiCl₄ therefrom by subjecting the carbon under anhydrous conditions to direct contact with a separate, hot, non-reactive gas.

5. A method for separating and recovering titanium tetrachloride from a residual gas mixture resulting from the chlorination, at temperatures ranging from 800–1350° C., of ilmenite in the presence of carbon and containing from about 2–10% by weight of said tetrachloride, comprising passing said gaseous mixture over a solid adsorptive agent within an anhydrous treating zone, and thereafter concurrently reactivating said agent and recovering the adsorbed TiCl₄ therefrom by desorbing the TiCl₄ from said agent through direct contact with and passage of a hot inert, separate anhydrous gaseous material thereover.

6. A method for separating and recovering titanium tetrachloride from a residual gas mixture resulting from the chlorination, at temperatures ranging from 800–1350° C., of ilmenite in the presence of carbon and containing from about 2–10% by weight of said tetrachloride, comprising passing said gaseous mixture over a solid adsorptive agent within an anhydrous treating zone, and thereafter concurrently reactivating said agent and recovering the adsorbed TiCl₄ therefrom under anhydrous conditions by desorbing the TiCl₄ from said agent through heat treatment to remove a portion of the TiCl₄ therefrom and then completing the desorption process by subjecting the heat-treated agent to direct contact with a separate, hot, inert, anhydrous gas stream.

References Cited in the file of this patent

UNITED STATES PATENTS

| Number | Name | Date |
|---|---|---|
| 1,595,683 | Burrell et al. | Aug. 10, 1926 |
| 2,207,597 | Pechukas | July 9, 1940 |
| 2,354,383 | Kiesskalt | July 25, 1944 |
| 2,527,964 | Robinson | Oct. 31, 1950 |
| 2,583,352 | Berg | Jan. 22, 1952 |

FOREIGN PATENTS

| Number | Country | Date |
|---|---|---|
| 317,629 | Great Britain | Aug. 22, 1929 |